Figure 1:
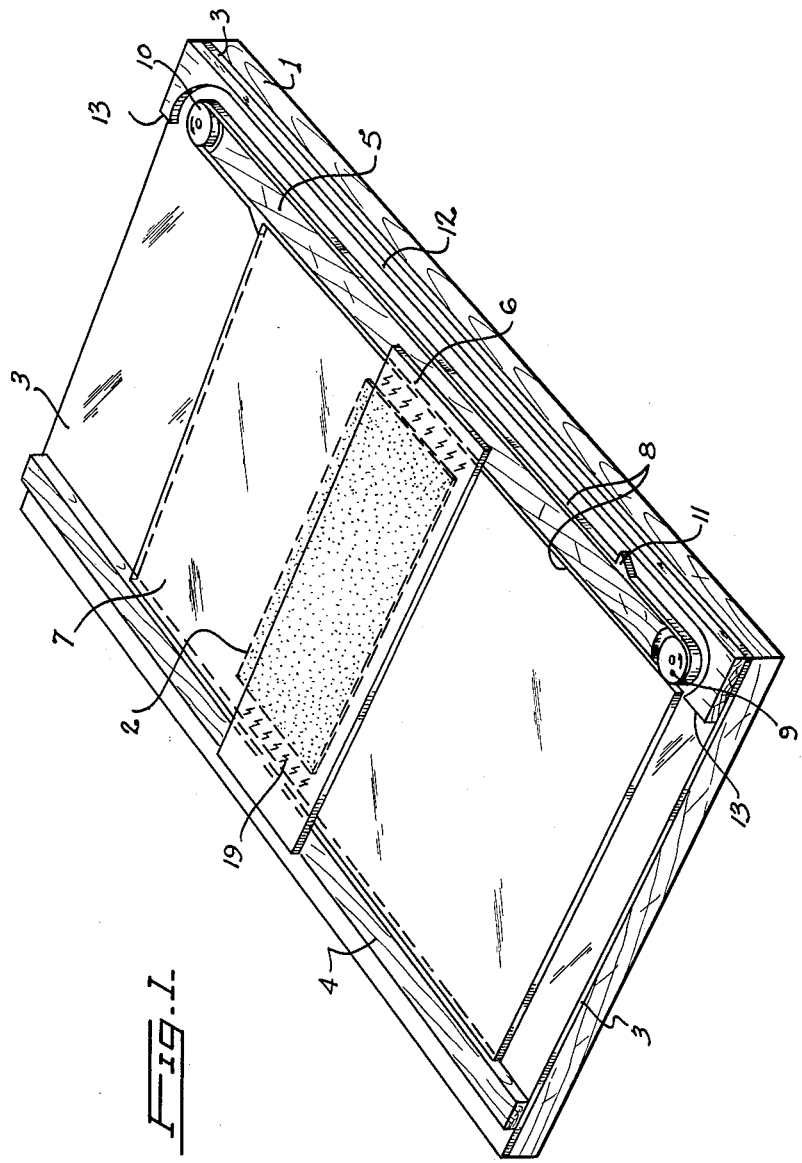

Dec. 5, 1961 S. BATESON 3,011,265
DEHYDRATION OF GLASS SURFACES
Filed July 14, 1958 2 Sheets-Sheet 1

SYDNEY BATESON

BY Cushman, Darby & Cushman
ATTORNEYS

3,011,265
DEHYDRATION OF GLASS SURFACES
Sydney Bateson, Oshawa, Ontario, Canada, assignor to Duplate Canada Limited, Toronto, Ontario, Canada
Filed July 14, 1958, Ser. No. 748,219
Claims priority, application Canada Mar. 11, 1955
11 Claims. (Cl. 34—1)

The present invention relates to a method and apparatus for the treatment of a glass surface, such treatment being preparatory to the application of a bonding material to such surface. For example, it has already become common practice to apply a bonded metallic or resinous coating to a sheet of glass.

Prior to the satisfactory bonding of other materials to glass surfaces, it is necessary to remove adsorbed water from the surface. The structure of glass is governed by the principle that each $Si^{4+}$ ion is surrounded tetrahedrally by four oxygen ions. Each oxygen is, on the average, shared by two Si ions.

When two fresh surfaces are created by fracturing a piece of glass, an equal number of units either with an uncoordinated oxygen or minus oxygen will remain on each side of the fracture. Using Weyl's notation these units make up a layer of structural units as follows:

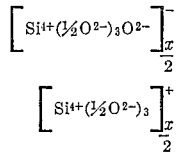

Although the layer is neutral, individual units are strongly polarised and will react with atmospheric water vapour:

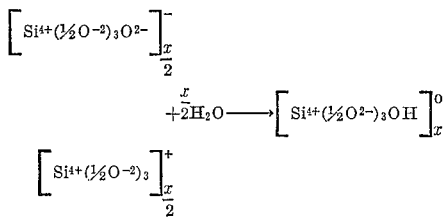

Presumably after exposure to the air, a freshly formed glass surface comprises a neutral layer of OH groups. It is suggested that bonding of a metallic layer to the glass is accomplished by chemical reaction with this layer.

A characteristic of the exposed OH groups is their ability to retain neutral water molecules by covalent hydrogen bonds. Consequently, if the glass is exposed to excess water vapour, a weakly bound layer will cover the surface:

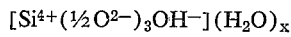

It is necessary to remove this adsorbed water before a satisfactory bonding of a surface layer of other material can be obtained.

In the methods of preparatory dehydration at present in use, the glass is either heated in a vacuum to a temperature of about 250° C. or, alternatively, is heated in air to a temperature somewhere in the range of 300° to 400° C. In all cases an oven is used and these methods are both costly and time consuming, being especially disadvantageous when forming one step of an assembly line type of operation. In addition, there is a tendency for the applied heat to burn off existing coatings such as temporary masking paint adhering to the surface of the glass, and the heat may even permanently damage the glass itself by distorting its shape.

The present invention concerns a method and apparatus for the dehydration of the surface of a body of glass in which the necessity of applying heat to the bulk of such glass is avoided. According to the invention dehydration is effected by subjecting the surface of the glass to the effects of high frequency high voltage spark discharges. This results in intense local heating which quickly evaporates the adsorbed water vapour, while having little effect on the temperature of the remainder of the glass.

Figure 2:
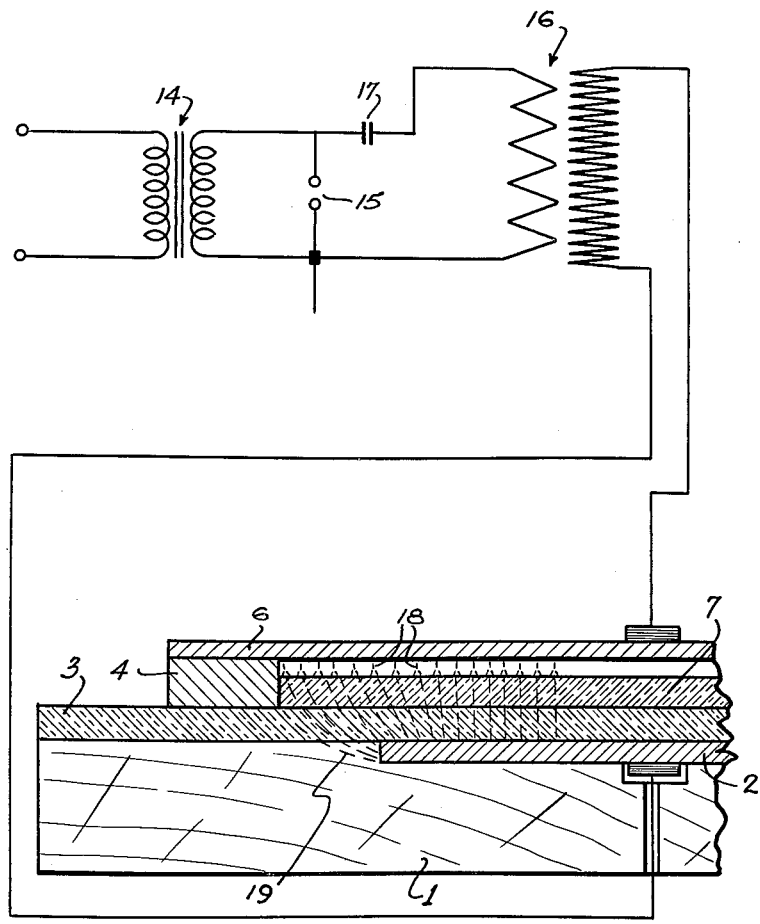

One method by which the present invention may be carried into practice is illustrated by way of example in the accompanying drawings, in which:

FIGURE 1 shows a perspective view of apparatus for dehydrating the surface of a glass sheet, the electrical circuit elements having been omitted from this view; and FIGURE 2 shows a fragmentary central sectional view of the apparatus seen in FIGURE 1 including the electrical connections.

The apparatus illustrated consists of a suitable base 1, such as a wooden table top, a lower electrode 2, preferably of aluminum, being arranged in a recess extending transversely across the centre of such base 1 but not to either edge thereof. Immediately above and in contact with the top surface of the base 1 and of the electrode 2, is a fixed insulating sheet 3, preferably formed of glass, such sheet 3 extending for the full length and width of the base 1, as best seen from FIGURE 1. Extending along the two lateral edges of the sheet 3 are raised insulating strips 4 and 5. Centrally of the length of such strips 4 and 5 is mounted an upper electrode 6, also preferably of aluminum, this electrode 6 extending transversely across the apparatus to rest at each end on one of said strips 4 and 5. There is thus formed between the electrode 6 and the upper surface of the insulating sheet 3 an elongated rectangular aperture through which a sheet 7 of glass to be treated may be passed, the strips 4 and 5 being spaced in accordance with the width of such sheet 7, so that one edge of the sheet 7 slides along the strip 4 while the other edge lies in contact with an endless belt 8 extending along the inner and outer edges of the strip 5 and around a drive pulley 9 at one end of such strip 5 and an idling pulley 10 at the other end, such belt 8 carrying a pair of projections 11 adapted to engage the rear surface of the sheets being treated, as illustrated in FIGURE 1. The assembly is completed by a guard strip 12 extending along the extreme edge of the sheet 3, outside the strip 5 and its associated belt mechanism, such strip 12 terminating in flat end surfaces 13 that form continuations of the surface of the belt 8 and act as guide surfaces for the sheet 7 that is fed through the apparatus.

The electrical parts of the apparatus are in themselves conventional and have only been illustrated diagrammatically. As will be seen from FIGURE 2, they consist of a mains-frequency step-up transformer 14, e.g. 120 volts to 15,000 volts, the secondary winding of which is connected to an adjustable spark gap 15 and, in parallel therewith, the primary winding of a Tesla coil 16 (inductance 81.7 microhenries) through a condenser 17 (e.g. 0.005 microfarad). The operation of a circuit of this character is well known, a high frequency high voltage of Tesla wave form appearing at the output of the secondary windings of the Tesla coil 16 (shown for simplicity in the drawing as a single winding). This output is fed to the respective electrodes 2 and 6 of the apparatus already described.

This high frequency high voltage established across the electrodes 2 and 6 will produce breakdown of the air and a spark from the electrode 6 across the air gap between such electrode and the upper surface of the sheet 7, with current flow through both the sheets 7 and 3, the longer and wider insulating sheet 3 ensuring that no sparks pass directly between the two electrodes 2 and 6 around the edges of the sheet 7 being treated. The sparks that pass between the top electrode 6 and the upper surface of the glass sheet 7 have been indicated at 18 in FIGURE 2, such sparks tending to disperse outwardly along the surface of the sheet 7 on making contact therewith. It is impractical to illustrate in the drawing how these sparks continually wander over the surface and thus provide a uniform intense local heating effect which effects evaporation of the adsorbed water vapour. Passage of current through sheets 7 and 3 has been represented by broken lines 19.

The circuit has a natural frequency of oscillation, which in the example taken was found to be about 250 kc./sec. The turns ratio being approximately 15 to 1, a theoretical peak voltage of 225 k.v. is generated. Bearing in mind the dimensions of the coil and electrodes it is estimated that as a practical matter this voltage represents a satisfactory upper working range of the whole apparatus if occasional flashovers are not to occur. Moreover, in order to realize the most efficient cleaning of the glass it is preferred to operate at a voltage of this order, although in some cases working with sheets of comparatively small area voltages down as low as 100 k.v. may be used. Experiments have proved that with a voltage below approximately 100 k.v. satisfactory results are not obtained. The preferred range is therefore 100–225 k.v. It is impossible to be very specific regarding frequency limits because no sharply defined points exist at which operation falls off seriously. The important aspect of the frequency is that it should be high enough to produce a large number of sparks in a comparatively short time so that the necessary area of glass can be treated without the process requiring an unduly long time to complete. The Tesla coil employed yielded a frequency of approximately 250 kc./sec. as far as can be determined, and higher frequencies would undoubtedly provide excellent results but may become more difficult to generate with the energy required. At lower frequencies, the process becomes less efficient, because the dehydration takes too long. Thus commercially a frequency of 250 kc./sec. or higher should be used, although the process is theoretically practicable at lower frequencies.

It has been found that, if the ends of the upper and lower electrodes 2 and 6 (considered lengthwise of the electrodes) are placed in exact alignment with each other, there is a tendency for the current to spread out around the edges of the sheet 7 being treated, which may result in uneven treatment of the various areas of the surface of such sheet. For this reason the lower electrode 2 has been made somewhat shorter than the upper electrode 6, so that the current 19 will flow inwardly and downwardly at the lateral edges of the sheet 7 being treated, as clearly seen in FIGURE 2. It has been proved by practical experiment that this provides a more uniform treatment of the surface of the sheet 7. Clearly, if more convenient, the upper electrode could be the shorter of the two electrodes, or they could be the same length but staggered.

To provide a similar staggering of the transverse edges of the two electrodes (i.e. the edges extending lengthwise of the electrodes and transversely across the apparatus in relation to the direction of travel of the glass) one of such edges should preferably be arranged slightly in advance of the other. In the apparatus illustrated, the lower electrode 2 has been chosen to be the one arranged in advance, although it is not significant which electrode is so chosen. It will thus be apparent that the current travelling between the transverse edges of the electrodes 2 and 6 will also travel non-vertically, similar to the manner illustrated in FIGURE 2. Although not so important as the staggering of the lateral edges, this second aspect of the edge staggering is also found useful in providing a more satisfactory finished product and in reducing any tendency for the sparks, which are passing between the upper electrode 6 and the insulating sheet 3 before the leading edge of the sheet 7 inters the space between the electrodes, to jump suddenly to a portion of the surface of the sheet 3 inward from the leading edge and thus leaving a strip of inadequately dehydrated surface at such leading edge. Similarly, staggering of the transverse edges of the electrodes 2 and 6 that are last encountered by the trailing edge of the sheet 7, is found to reduce any tendency for a strip of surface at such trailing edge to receive attenuated treatment.

In operation, the sheet 7 to be treated is passed slowly through the apparatus with the high frequency high voltage applied between the electrodes 2 and 6. The actual time employed will, of course, vary with the dimensions of the parts, but a period of approximately 5 minutes has been found satisfactory with glass sheets of a size normally commercially employed and having the relative dimensions illustrated in the drawings.

This application is a continuation-in-part of my co-pending application Serial No. 545,944, filed November 9, 1955, now abandoned.

I claim:

1. A method of treating a surface of a glass body to effect dehydration of said surface, comprising applying a high frequency high electric voltage between a first and a second electrode and simultaneously interposing said body between the said electrodes with an air gap between said surface and said first electrode, said voltage being of a wave form having a peak value of not less than approximately 100,000 volts and sufficient to effect breakdown of said air gap to cause spark discharges to pass between said first electrode and said surface and corresponding currents to travel through said body to said second electrode, the energy of said spark discharges effecting dehydration of said surface.

2. A method as claimed in claim 1, wherein said electrodes are isolated from each other by an insulating member, said body being interposed between the first said electrode and said insulating member.

3. A method as claimed in claim 1, wherein the frequency of the voltage is at least approximately 250 kilocycles per second.

4. A method as claimed in claim 1, wherein the peak value of the wave form of said voltage is of the order of 225,000 volts.

5. A method as claimed in claim 1, including the step of effecting relative movement between said electrodes on the one hand and said body on the other hand whereby to expose parts of said surface of said body progressively to said spark discharge.

6. A method as claimed in claim 1 wherein said voltage is of a Tesla wave form.

7. Apparatus for dehydrating a surface of a sheet of glass, comprising a flat elongated generally rectangular table-like supporting member, a first elongated electrically conducting plate recessed into said supporting member to extend across the major width thereof but not to the extreme edges, a sheet of insulating material superposed on said supporting member to cover at least the major part thereof including said first plate and a substantial area of said supporting member around the entire perimeter of said plate, a pair of raised strips mounted on said insulating sheet and each extending along one lateral edge of said supporting member somewhat outwardly displaced from the ends of said first plate, a second elongated electrically conducting plate longer than said first plate and mounted at respective ends on each of said strips so as to extend across said supporting member spaced from said insulating sheet in a position generally parallel to and generally in register with said first plate, means connected to said plates for providing a high frequency high electric voltage between said electrodes, and means for moving said sheet of glass along said insulating sheet between said strips beneath said second plate.

8. Apparatus as claimed in claim 7, wherein said means for moving said sheet of glass comprise a driven endless belt extending along the inside edge of a first of said strips and at least one projection from said belt positioned to engage the trailing edge of said sheet, the spacing between the two said strips corresponding to the width of said sheet so that said belt and the inside edge of the second of said strips engage the lateral edges of said sheet to act as guide surfaces therefor.

9. Apparatus as claimed in claim 7, wherein said means for providing a high frequency high electric voltage comprise a Tesla type air-cored transformer the high voltage side of which is connected to said plates and the low voltage side of which, through a condenser, is connected in parallel with a spark gap energized by the secondary of a step-up mains-frequency transformer.

10. Apparatus for dehydrating a surface of a body of glass comprising a flat elongated table-like supporting member; a first elongated electrode mounted on said supporting member to extend transversely thereacross; a flat insulating member mounted over said supporting member to cover said first electrode and an area of said supporting member extending substantially beyond the perimeter of said first electrode; a second elongated electrode mounted above said first electrode, said flat insulating member and said second electrode defining a space between them adapted to receive a sheet of glass in overlying relationship on said flat insulating member and to provide an air gap between said second electrode and the upper surface of said sheet, said second electrode extending transversely across said supporting member generally parallel to and generally in register with said first electrode; and means connected to said electrodes for providing thereacross a high frequency high electric voltage of a wave form having a peak value of not less than approximately 100,000 volts and sufficient to effect breakdown of said air gap to cause spark discharges to pass between said second electrode and said surface and corresponding currents to travel through said glass sheet and said insulating member to said first electrode, each pair of corresponding ends of the two said electrodes being arranged slightly out of alignment with one another lengthwise of said electrodes.

11. Apparatus for dehydrating a surface of a body of glass comprising a flat elongated table-like supporting member; a first elongated electrode mounted on said supporting member to extend transversely thereacross; a flat insulating member mounted over said supporting member to cover said first electrode and an area of said supporting member extending substantially beyond the perimeter of said first electrode; a second elongated electrode mounted above said first electrode, said flat insulating member and said second electrode defining a space between them adapted to receive a sheet of glass in overlying relationship on said flat insulating member and to provide an air gap between said second electrode and the upper surface of said sheet, said second electrode extending transversely across said supporting member generally parallel to and generally in register with said first electrode; and means connected to said electrodes for providing thereacross a high frequency high electric voltage of a wave form having a peak value of not less than approximately 100,000 volts and sufficient to effect breakdown of said air gap to cause spark discharges to pass between said second electrode and said surface and corresponding currents to travel through said glass sheet and said insulating member to said first electrode, at least one of the pairs of corresponding lengthwise extending edges of the two said electrodes being arranged with one such edge slightly out of alignment with the other of such edges.

References Cited in the file of this patent
UNITED STATES PATENTS

| | | |
|---|---|---|
| 2,042,145 | Darrah | May 26, 1936 |
| 2,231,457 | Stephan | Feb. 11, 1941 |
| 2,434,573 | Mann et al. | Jan. 13, 1948 |
| 2,867,912 | Kritchever | Jan. 13, 1959 |
| 2,902,575 | Guyer | Sept. 1, 1959 |